United States Patent

Ueltz et al.

[15] 3,637,360
[45] Jan. 25, 1972

[54] PROCESS FOR MAKING CUBICAL SINTERED ALUMINOUS ABRASIVE GRAINS

[72] Inventors: Herbert F. G. Ueltz, Youngstown, N.J.; Alfred G. Rzucidlo, Niagara Falls, N.Y.

[73] Assignee: U.S. Industries, Inc.

[22] Filed: Aug. 26, 1969

[21] Appl. No.: 853,184

[52] U.S. Cl. ...........................51/309, 51/293, 204/180 R
[51] Int. Cl. ..................................B24d 3/02, C09c 1/68
[58] Field of Search..................51/293, 298, 309; 204/180 R

[56] References Cited

UNITED STATES PATENTS

| | | | |
|---|---|---|---|
| 993,888 | 5/1911 | Schwerin | 204/180 R |
| 2,085,537 | 6/1937 | Lyons | 204/180 R |
| 2,900,320 | 8/1959 | Metcalfe et al. | 204/180 R |
| 3,372,102 | 3/1968 | Lennon | 204/180 R |
| 3,449,230 | 6/1969 | Heron et al. | 204/180 R |
| 3,451,911 | 6/1969 | Tannenberger et al. | 204/180 R |
| 3,491,491 | 1/1970 | Ueltz | 51/309 |

Primary Examiner—Donald J. Arnold
Attorney—Barlow and Barlow

[57] ABSTRACT

Process for making an aluminous abrasive grain formed from bauxite, or mixtures of bauxite and Bayer Process alumina, wherein the comminuted aluminous material is mixed with water and ferric ammonium citrate and reduced to a state of fine subdivision by milling to give a fluid slurry of high solid content, placing said slurry in an electrophoretic cell having one or more electrically conducting rotating anodes, and one or more electrically conducting stationary cathodes. The slurry is maintained at a predetermined level so that the rotating anodes are partially immersed. The anodes are connected to a source of positive direct current and the circuit completed by connection of the cathodes to the same source of direct current but to the negative terminal thereof. The solid aluminous material migrates to the anodes where it adheres as a layer which is continuously removed from the slurry by rotation of the anodes, is partially dried by impingement of warm air whereupon the layer releases from the surface of the anodes in the form of platelike pieces which are blown free of the cell by the warm airstream. The layer is controlled to a thickness equal in one dimension of the final grain compensated for subsequent shrinkage. The platelike pieces resulting are further dried, broken to approximately cubical grains, screened, optionally rounded by air mulling, screened, sintered and screened to give the final product.

12 Claims, 4 Drawing Figures

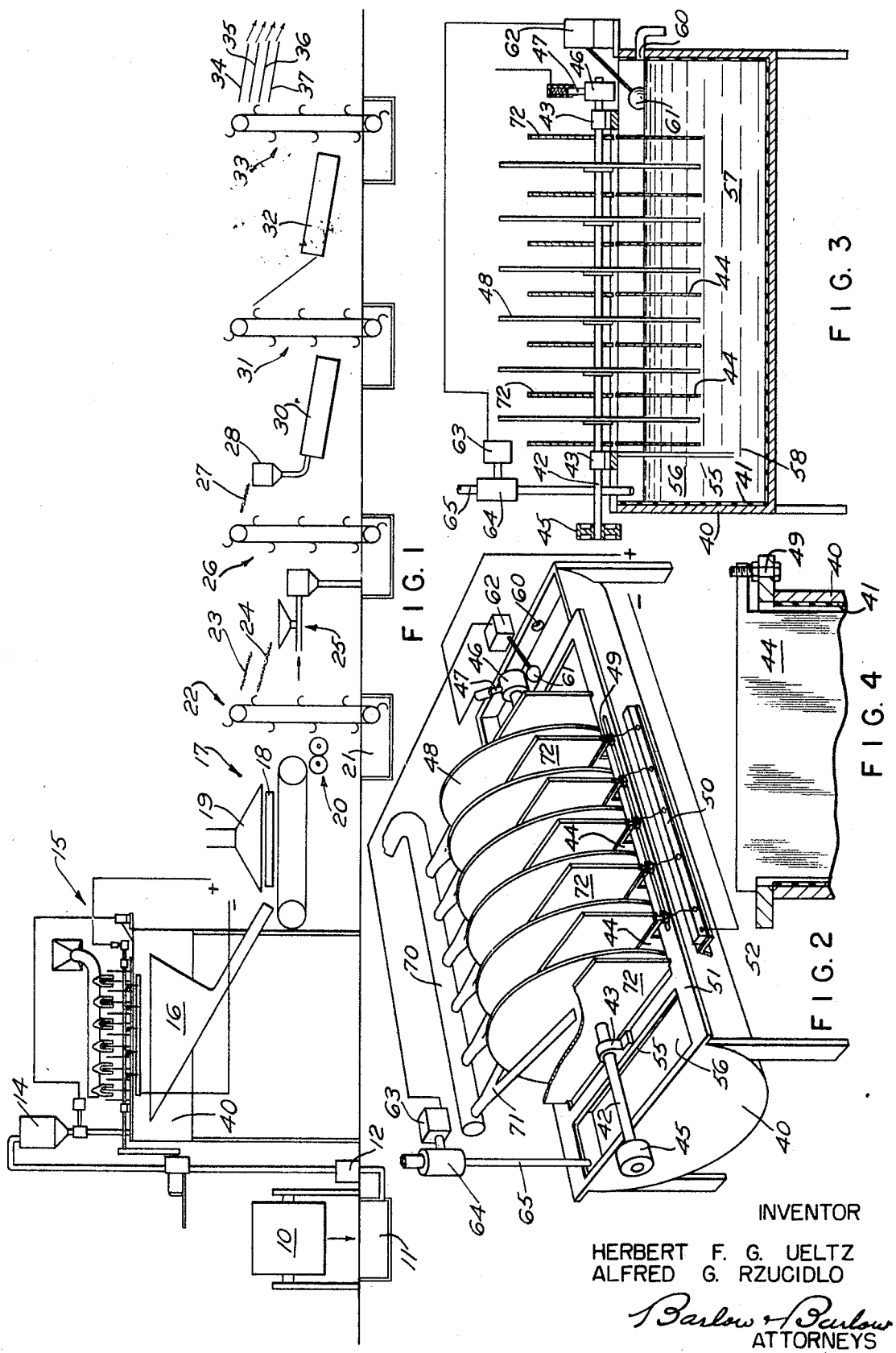

PROCESS FOR MAKING CUBICAL SINTERED ALUMINOUS ABRASIVE GRAINS

CROSS-REFERENCE TO RELATED APPLICATIONS

Subject matter related to copending applications and assigned to the same assignee is as follows: Ser. No. 697,905—Abrasive and Method of Making the Same, filed Jan. 15, 1968, and now U.S. Pat. No. 3,491,492; Ser. No. 697,599—Aluminous Slurries, filed Jan. 15, 1968, and now U.S. Pat. No. 3,491,491; Ser. No. 697,904—Abrasive Breaking Device and Method, filed Jan. 15, 1968, and now U.S. Pat. No. 3,491,929.

BACKGROUND OF THE INVENTION

Sintered abrasives, made by sintering milled bauxite agglomerates, have been known for some time and have proved of particular effectiveness in high-pressure snagging of stainless steel billets.

In copending applications cited above, a new process has been described which is based on chemical consolidation, eliminating the need for the application of affirmative pressure or physical consolidation. This new process also permits grains of optimum grain shape to be produced without extrusion or pressing, thus eliminating the need for expensive high-pressure equipment or precisely dimensioned dies. The new process is ideally suited for automation as the need for extensive maintenance and close adjustment of complex equipment is minimal.

SUMMARY OF THE INVENTION

This invention describes a process for making sintered abrasive grains of high density and generally cubical shape in which no affirmative pressure is used. Calcined bauxite or mixtures of calcined bauxite with Bayer Process alumina are provided in a milled aqueous slurry having a high concentration of the solid by weight by virtue of the presence of a material such as ferric ammonium citrate and being electrophoretically active by virtue of the presence of the said ferric ammonium citrate, placing this slurry in a cell in which are disposed one or more electrically conducting stationary cathodes interleaved with but separated from one or more electrically conductive rotating anodes to a depth such that the lower portions of said rotating anodes are immersed in the slurry, attaching said anodes to the positive pole of a source of direct current and attaching said cathodes to the negative pole of the same source of direct current causing deposition of the solid phase uniformly on the anodes in a layer having substantially a thickness equal to one dimension of the final abrasive grain corrected for shrinkage, with rotation of the anodes continuously removing the deposited layer from the constantly replenished slurry and carrying it into a stream of warm air which causes the deposit to release from the anode surfaces and blows the released platelike fragments clear of the cell where they fall upon the belt of a continuous drying machine, are carried through a dryer and are discharged as dry platelike fragments which fall through a breaking device having rolls of different resiliency as set forth in application Ser. No. 697,904 and are thereby broken to approximately cubical- or cubical-shape grains, screened to remove excessively fine particles, optionally impelled by air through a curved pipe to round the corners and edges, rescreened to remove dust, sintered in a kiln at temperatures between 1,300° C. to about 1,600° C. and finally screened to size.

BRIEF DESCRIPTION OF THE DRAWINGS

FIG. 1 is a schematic view showing the various steps in the process;

FIG. 2 is a perspective view of the electrophoretic cell of this process;

FIG. 3 is a sectional view of FIG. 2; and

FIG. 4 is a section of a fragmental portion of a cathode plate.

DESCRIPTION OF THE PREFERRED EMBODIMENT OF THE INVENTION

We have now discovered that the slurries of the copending applications, Ser. Nos. 697,905 and 697,599, are responsive to an electric field and a remarkably sharp and efficient separation of the solid and liquid phases therein may be effected by electrophoresis. Thus separation may be made continuously, employing the particular type of a cell described herein. The thickness of the solid deposit may be very precisely controlled by the magnitude of the electric current and the speed of anode rotation. The water is separated from the solid without the necessity of extensive evaporation. Since fresh slurry is fed to the cell continuously and the product and water separately and continuously discharged, a very smooth and efficient operation results. The product of this process is a platelike material of high unfired density, which yields a high-density ceramic material after sintering.

Comminuted calcined bauxite or a mixture of comminuted calcined bauxite and Bayer Process alumina, water, and ferric ammonium citrate are charged into a ball mill 10 (FIG. 1) filled partially with ceramic milling media in accordance with accepted good practice. The aluminous material comprises at least 45 percent by weight and not more than 80 percent by weight of the charge, the water at least 20 percent by weight and not more than 55 percent by weight of the charge, and the ferric ammonium citrate at least 0.2 percent by weight and not more than 4.0 percent by weight of the charge. The mill is closed and rotated until the particles of aluminous material have an average size of 7 microns or smaller at which time the resulting slurry is discharged into a sump or reservoir 11 from whence it is pumped by pump 12 to a holding tank 14. The slurry is discharged from the holding tank to electrophoretic cell 15. The construction of the electrophoretic cell is set forth in more detail by FIG. 2. The solid portion of the slurry is deposited on the rotating anodes when the direct current flows, and the water is discharged substantially continuously to be used again or discarded. As the rotating anodes, coated with a layer of solid deposit, rise from the slurry, they are impinged by a stream of warm air which causes the deposit to release from the anode surfaces and to be blown clear of the cell where the platelike fragments are guided by hopper 16 on to the belt of drying machine 17.

The belt conducts the fragments into a drying zone heated by radiant or warm air heaters 18, and the water vapor extracted from the fragments is exhausted by a hood and blower system 19. At the discharge end of the drying machine, the dried fragments fall through breaking machine 20 comprising rollers of different resiliencies, where the fragments are broken into approximately cubical or cubical-shape grains. The grains then fall into a pit 21 and are lifted by elevator 22 and discharged on screens 23, 24 where they are screened to the final size desired allowing for shrinkage in sintering. The oversize grains are returned to the breaking machine to be broken further, while the undersize particles are returned to the ball mill for regeneration as slurry.

At this point an optional step may or may not be taken. If it is desired to round the edges and corners, the grains are allowed to fall into air mulling device 25 elevated by elevator 26 and screened to remove dust by means of screen 27 and discharged to kiln holding tank 28. If the rounding operation is not desired, the grains may be discharged directly from screens 24 to kiln holding tank 28. The grains are then sintered by passage through rotary kiln 30, the hot grains lifted by elevator 31, passed through cooler 32, lifted by elevator 33 and finally screened to size by screens 34, 35, 36, 37.

FIG. 2 shows in greater detail the electrophoretic cell. It comprises a tank 40 which is preferably made of steel and may be lined with rubber or other durable nonconducting material 41. Superimposed on the tank is a shaft 42 supported by bearings 43 on which shaft disc-shaped anodes 48 are mounted. The shaft is rotated by a drive unit (not shown) through nonconducting coupling 45. At one end of the shaft is a slipring 46 contacted by brush 47. Interleaved between the anodes below shaft 42 are cathode plates 44 secured in place by bolts 49 and connected to buss bar 50. The bolts are positioned in slotted, nonconducting rail 51.

The cell tank is divided by baffle 55 into two compartments, one for charging 56, and one to contain the anodes and cathodes 57. The baffle is open at the bottom at 58 to permit slurry to flow from the charging compartment to the electrode compartment. The liquid is maintained at a fixed level by overflow hole 60 and controlled by floater 61 and photoelectric unit 62 which regulates solenoid valve 63 and pneumatic slurry valve 64, the slurry being conducted to the charging compartment via pipe 65.

Warm air is conducted from an air heater (not shown) by header 70 and directed on the anode surfaces by bifurcated jet nozzles 71. The anodes are separated from each other by baffles 72 of nonconducting material.

Operation of the Electrophoretic Cell

Employing a slurry as heretofore specified and additionally described in application Ser. No. 697,599, the charging compartment 56 of the tank 40 is filled with slurry via valve 64 and pipe 65 until the liquid level in the cell is up to overflow hole 60. The cell is energized by connection of bus bar 50 to the negative side of a source of direct current and connection of slipring 46 and brush 47 to the positive side of the same source of direct current. Shaft 42 and anodes 48 are rotated at the desired speed through insulated coupling 45 by a drive unit not shown. Warm air is supplied from a heater (not shown) through header 70 and thence through branch pipes 71 so as to impinge on the surfaces of the anodes. Electrophoresis will then take place and a coherent solid layer will deposit on the anodes. The thickness of the layer will depend on the anode current density and the time of immersion which are in turn controlled by the current flow through the cell, and the speed of rotation. As the deposit is raised out of the liquid by rotation of the anodes, the warm air impingement partly dries the deposit which then releases from the anode surfaces and is impelled in fragments by the air stream so as to be blown free of the cell.

As the solid is removed at the anodes, the corresponding water is generated at the cathodes. This water is lighter than the slurry and rises to the top as a distinct layer. The floater 61 is so adjusted that it will reside at the water-slurry interface, and as more water is generated, the floater will reside at a lower level activating the photoelectric control unit 62 and the solenoid valve 63 which opens valves 64 admitting fresh slurry to the cell.

This slurry flows under baffle 55 causing the liquid level in the electrode compartment to rise, and the superincumbent water to flow from the cell through overflow hole 60. Thus the slurry is replenished and the immersion of the electrodes is maintained constant.

We prefer to use a slurry composition as follows:
75.63 percent calcined bauxite
23.60 percent water
0.77 percent ferric ammonium citrate
or
37.81 percent Bayer Process alumina
37.82 percent calcined bauxite
23.60 percent water
0.77 percent ferric ammonium citrate We then mill this to a slurry wherein the particle size of the aluminous material is 7 microns or finer, but we prefer to mill so that the average size is 1 to 2 microns. Ball mills of the conventional rotating type may be used as well as vibratory types. The milling media we prefer is dense high alumina ceramic in the form of balls or rods, the size and amount in accordance with good practice for the particular mill in use. The slurry is then transferred by pumping to a holding tank from which the slurry may flow by gravity to further steps in the process. The next step is separation of a suitable solid deposit from the liquid phase and this is done by electrophoresis. In the slurry of our process, it is evident that the ferric ammonium citrate dissolves in the water and ionized whereupon the negatively charged ions become attached to the tiny particles of aluminous material and effectively render them negatively charged, whereas the positive ions are relatively loosely held and become associated with the water. The exact mechanism by which this works is not completely known but it has been found with the given aluminous materials that ferric ammonium citrate is the most effective agent known by us for this purpose although ferric ammonium tartrate will work to some degree. When the slurry is introduced in the cell in contact with the energized electrodes, the negatively charged solid particles migrate to the positively charged anode and the water, with its associated positive charges, migrates to the negatively charged cathodes. The anode deposit, therefore, consists of a compact, physically firm layer, the thickness of which may be controlled by the amount of current flowing and the length of time in which the anode remains immersed.

These factors are controlled by the design of the cell and its associated equipment. The anodes and cathodes are in the form of interleaved plates standing on edge. It has been found that this geometrical disposition is desirable since there may be, under certain conditions of operation cited, reactions which generate gas bubbles, particularly at the cathodes, and by spacing the plates as stated, these bubbles of gas may rise from the cathodes without getting trapped in an anode deposit, thereby causing objectionable occlusions or porosity.

We have found by experiment that for the cathode we prefer to use lead or lead plated on steel, and for the anodes we prefer chromium plated steel since it is relatively inert, and the deposit strips easily therefrom. Other metals, however, may be used for both electrodes.

The anode discs, which are strung on the shaft, are rotated at a controlled speed by means of an external drive unit. The anode discs are immersed on their lower part in the slurry. Thus, the speed of rotation and depth of immersion determine the time that deposition will take place over a given area on the anode, and the rate of deposition will be determined by the anode current density and temperature. We prefer to operate the cell at temperatures between room temperature and the boiling point of water, but the factor of temperature is relatively dependent upon other operating parameters such as current flow, the geometry of the cell and the amount of slurry processed.

The deposit builds up on the anode faces to a relatively uniform thickness which is established by the operating parameters and may be controlled within narrow limits. The rotation of the anodes then lifts the deposit from the slurry. At this point the deposit is a solid but is still damp and may contain about 12 percent moisture. By use of hot air jets a small amount of further drying causes the deposit to flake off of the anode discs spontaneously, and the fragments are blown by the airstream clear of the cell where they go to further processing.

Water is generated at the cathodes. This water is lighter in density than the slurry and it therefore rises to the top. A level control is provided which has a floater having a density intermediate between that of the water and the slurry. As the amount of water increases the floater will assume a lower position actuating a photoelectric device, air valve, and pneumatic valve so as to release fresh slurry which is deposited at the bottom of the cell. This causes an increase in liquid level and raises the superincumbent water to the point where it overflows and is effectively removed from the cell.

The process is limited with regard to anode current density. At anode current densities above about 0.2 amperes per square inch the deposit begins to show undesirable porosity, probably due to gas-generating side reactions.

The cell may contain any number of anode and cathode elements of any size that it is practicable to handle. We prefer to use a cell having from 12 to 24 anodes, each anode being a chromium plated steel disc of about 24 inches in diameter but it must be emphasized that a wide range of sizes may be used. In fact, our test cell has employed as anode a disc 16 inches in diameter.

The platelike fragments from the cell are solid but still damp and drying of these is completed in any type of suitable dryer but we prefer to use a belt dryer which is continuous in operation. The belt dryer may be operated at any temperature which will assure expeditious drying but not so high as to cause disintegration of the solid by steam generation. Drying temperatures are below the boiling point of water generally. These plates having a thickness the same as that desired in the final grain plus the amount of shrinkage expected are broken into approximate cubical grains as set forth in our copending application, Ser. No. 697,904, that is by passing them through rollers of different resiliencies. These grains are screened in conventional manner to obtain the sizes desired. If any grains are larger than those desired they may be recirculated to the breaking rollers, and any particles too fine are recirculated to the ball mill where they may be regenerated into slurry and be used over again. The grains of the desired size may then be further processed essentially in the manner set forth in copending, Ser. No. 697,905 comprising optional air mulling, screening, sintering, cooling, and final screening.

We now provide experimental reductions to practice as examples of this invention, said examples to serve in an illustrative sense and not in a limiting sense. The electrophoretic cell employed a single disc anode 16 inches in diameter and about one-eighth of an inch thick and two flanking cathodes of sheet lead spaced 1 inch on either side of the anode and parallel thereto.

EXAMPLE I

The anode immersion was 4 inches measured from the lowest point on the disc along a radius to the intersection of the surface of the slurry. The speed of anode rotation was 3 revolutions per hour. The current flow was 1 ampere. The slurry consists of 75.6 percent calcined bauxite, 23.00 percent water and 0.77 percent ferric ammonium citrate and the solid portion thereof averaged 1 to 2 microns in size. This produced an excellent deposit free of pores which was 0.071 inch thick. When the current flow was raised to 4 amperes an excellent deposit was obtained about 0.98 inch thick.

EXAMPLE II

At an anode immersion of 4⅜ inches and rotation of anode 1 revolution in 6 minutes 17 seconds and a current flow of 4.9 amperes a deposit was obtained which was 0.055 inch thick and the damp solid was generated at a rate of 96 grams per minute. When the current was raised to 6.5 amperes the deposit was 0.078 inch thick and was obtained at a rate of 132 grams per minute. Both of these deposits were excellent. The anode speed was changed to 1 revolution in 4 minutes 47 seconds, the current flow was 7.1 amperes and the deposit obtained was 0.064 inch thick at a rate of 128 grams per minute. When the current was raised to 8.9 amperes the deposit was 0.076 inch thick and was obtained at the rate of 170 grams per minute. These were excellent deposits and all contained approximately 12 percent moisture by weight.

EXAMPLE III

The anode immersion was 4 inches and anode speed 1 revolution in 2 minutes 43 seconds. The current flow was 10 amperes. The deposit obtained was about 0.080 inch thick at a rate of 375 grams per minute. The anode current density was about 0.13 ampere per square inch.

The current was then raised to 14 amperes giving an anode current density of about 0.18 ampere per square inch. The deposit in this case had a thickness of 0.096 inch.

The dried unfired products of these runs were found to have densities of from 2.37 to 2.51 g./cc.

We claim:

1. The process for making aluminous abrasive grain comprising the preparation of a fluid slurry of finely divided aluminous material chosen from the group consisting of calcined bauxite or mixtures of calcined bauxite and Bayer Process alumina in water which is electrophoretically active by virtue of the presence of ferric ammonium citrate, placing said slurry in an electrophoretic cell having at least one electrically conducting rotating anode and at least one electrically conducting cathode, so that the rotating anode and the cathode are partially immersed in said slurry, connecting said anode to a source of positive direct current and said cathode to the negative side of the same source whereby the solid aluminous material migrates to the anode where it adheres as a layer and is raised from the slurry by rotation of the anode, partially drying and removing the layer of material from the anode, drying the resulting fragmented deposit, breaking the dried deposit to granules, screening the granules, sintering the granules, and screening the granules to final size.

2. Process according to claim 1 wherein the aluminous material is calcined bauxite.

3. Process according to claim 1 wherein the aluminous material is a mixture of calcined bauxite and Bayer process alumina, said Bayer process alumina comprising from 1 to 50 percent by weight of said mixture.

4. Process according to claim 1 wherein multiple rotating anodes and multiple interleaved stationary cathodes are provided.

5. Process according to claim 1 wherein the granules before sintering are rounded by air mulling.

6. Process according to claim 1 in which the anode current density is below 0.2 ampere per square inch.

7. Process according to claim 1 in which a stream of warm air is impinged on the deposit to cause said deposit to release from the rotating anode and be ejected from the cell.

8. Process according to claim 1 wherein the rotating anode is controlled as to velocity and the electric current flow is controlled in magnitude so as to produce a deposit having substantially the same thickness as one dimension of the final grain adjusted for shrinkage.

9. Process according to claim 1 in which the slurry has substantially the composition 75.63 percent calcined bauxite, 23.60 percent water and 0.77 percent ferric ammonium citrate.

10. Process according to claim 1 wherein the slurry has substantially the composition 37.81 percent Bayer process alumina, 37.82 percent calcined bauxite, 23.60 percent water and 0.77 percent ferric ammonium citrate.

11. Process according to claim 1 wherein the average particle size of the aluminous material in the slurry is below 7 microns.

12. The process for making aluminous abrasive grain comprising the preparation of a fluid slurry of finely divided aluminous material chosen from the group consisting of calcined bauxite or mixtures of calcined bauxite and Bayer Process alumina in water which is electrophoretically active by virtue of the presence of ferric ammonium tartrate, placing said slurry in an electrophoretic cell having at least one electrically conducting rotating anode and at least one electrically conducting cathode so that the rotating anode and the cathode are partially immersed in said slurry, connecting said anode to a source of positive direct current and said cathode to the negative side of the same source whereby the solid aluminous material migrates to the anode where it adheres as a layer and is raised from the slurry by rotation of the anode, partially drying and removing the layer of material from the anode, drying the resulting fragmented deposit, breaking the dried deposit to granules, screening the granules, sintering the granules, and screening the granules to final size.

* * * * *